S. I. SCHWABACHER.
SPECTACLES.
APPLICATION FILED MAY 20, 1919.

1,351,491.

Patented Aug. 31, 1920.

Inventor.
Samuel I. Schwabacher.
by Fred P. Gorin
Atty.

UNITED STATES PATENT OFFICE.

SAMUEL I. SCHWABACHER, OF SEATTLE, WASHINGTON.

SPECTACLES.

1,351,491.

Specification of Letters Patent. Patented Aug. 31, 1920.

Application filed May 20, 1919. Serial No. 298,355.

*To all whom it may concern:*

Be it known that I, SAMUEL I. SCHWABACHER, a citizen of the United States, residing at Seattle, in the county of King and State of Washington, have invented certain new and useful Improvements in Spectacles, of which the following is a specification.

My invention relates to a device adapted to be used in viewing moving pictures or the like.

An important object of the invention is to provide a device of the above mentioned character, which is adapted to remove the strain from the eyes when viewing moving pictures, and which may be worn upon the nose as the ordinary eye-glass or spectacles.

Other objects and advantages of the invention will be apparent during the course of the following description.

Figure 1:
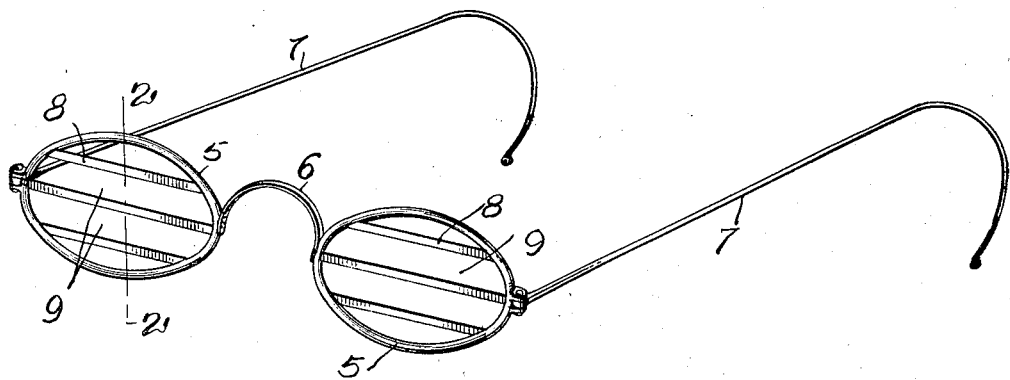
Figure 2:
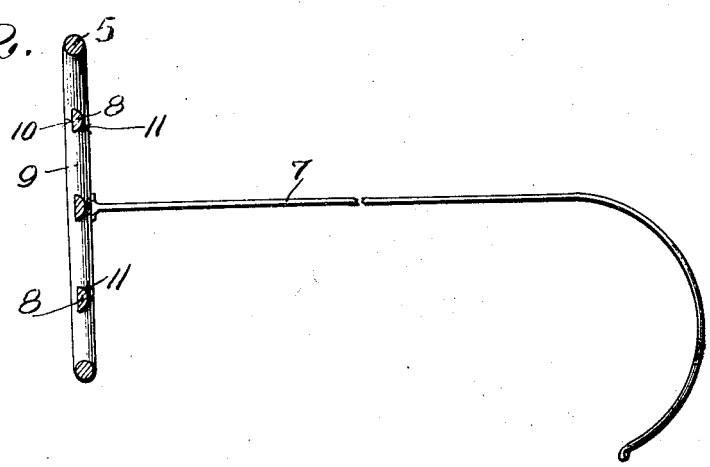

In the accompanying drawings forming a part of this specification and in which like numerals are employed to designate like parts throughout the same, Figure 1 is a perspective view of a device embodying my invention, and, Fig. 2 is a transverse sectional view taken on line 2—2 of Fig. 1.

In the drawings, wherein for the purpose of illustration is shown a preferred embodiment of my invention, the numeral 5 designates a pair of frames, which may be elliptical, circular, or of any other suitable shape. These frames are connected by a nose bridge 6. Connected with the outer ends of the frames 5 are templers or bows 7, of the usual construction, and adapted to engage behind the ears of the wearer.

Arranged in each frame 5 are horizontal spaced rods or members 8, which are rigidly secured therein by any suitable means. These members provide spaced horizontal openings 9 therebetween. The members 8 are approximately semi-circular in cross-section, and have flat faces 10 arranged forwardly and convex faces 11 arranged rearwardly. The rear convex faces 11 are preferably roughened and are of a dull color, such as black, so that they will not reflect light to the eyes of the user.

I have discovered that when a device of this character is used in the manner of an ordinary eye-glass or spectacles, a moving picture may be observed, and the strains which usually occur during such observation, will be entirely eliminated. Without attempting a technical explanation of the reasons for this result, it is believed that the comparatively narrow openings afforded by the cross bars, cut off most of the rays that would ordinarily enter the eye beyond a particular line, and by thus reducing the illumination give a better definition to the image and so relieve the strain on the eye. Any light coming from the rear of the observer, which would otherwise be reflected into the eye and increase the eye strain, is reflected, if at all, beyond the eye range by the rounded form of the rear portions of the cross bars, and the reflection of any character minimized by the dull color of such bars.

It is to be understood that the form of my invention herewith shown and described is to be taken as a preferred example of the same, and that various changes in the shape, size, and arrangement of parts may be resorted to without departing from the spirit of my invention or the scope of the subjoined claim.

Having thus described my invention, I claim:

A device for protecting the eyes in viewing motion pictures, comprising vision frames for the eyes, the openings of said frames being bridged by bars arranged in parallelism and horizontal to the line of vision, each bar being within the plane of the frame and rounded on the side next the eye, the opposing side of the bar being flat, the rounded side of each bar being of dull color.

In testimony whereof I affix my signature.

SAMUEL I. SCHWABACHER.